United States Patent Office 2,763,112
Patented Sept. 18, 1956

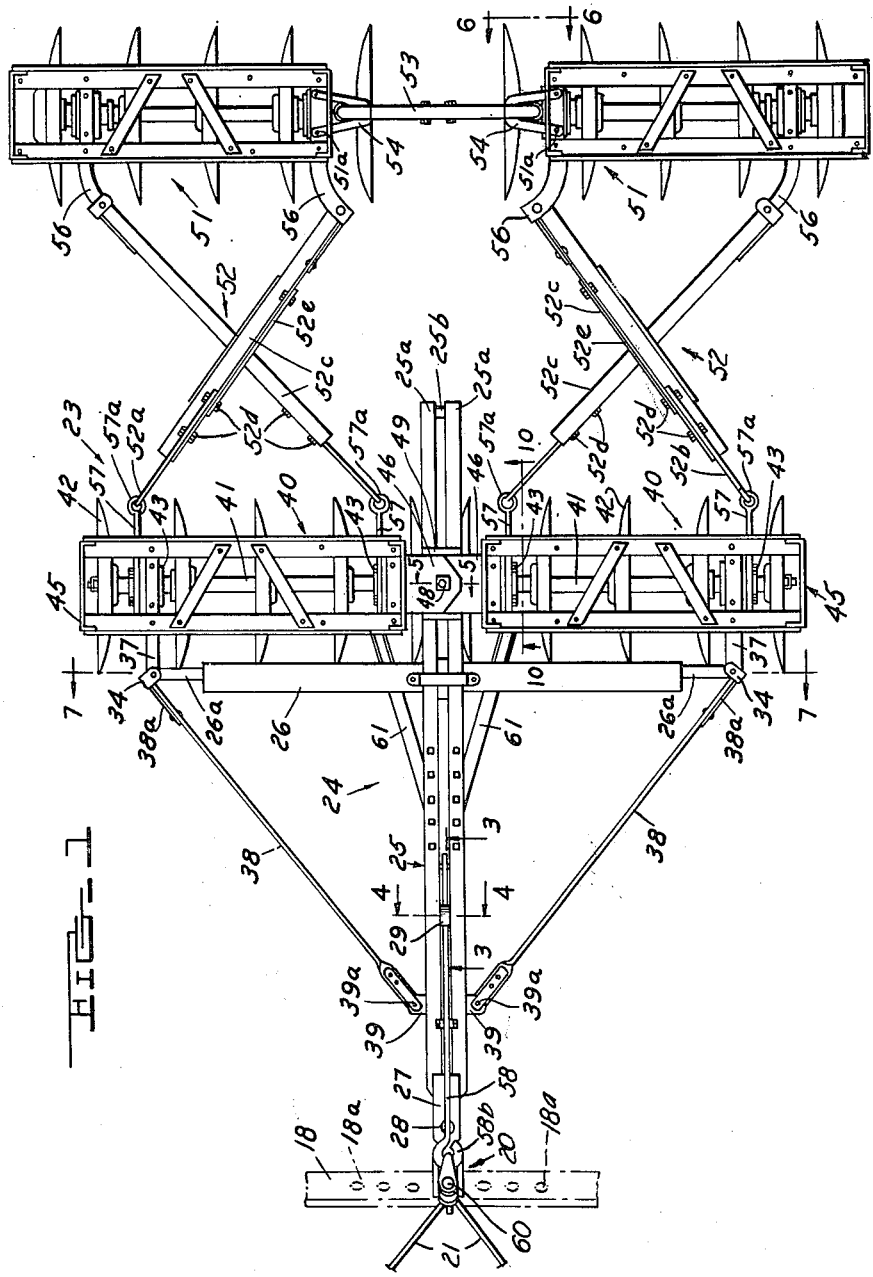

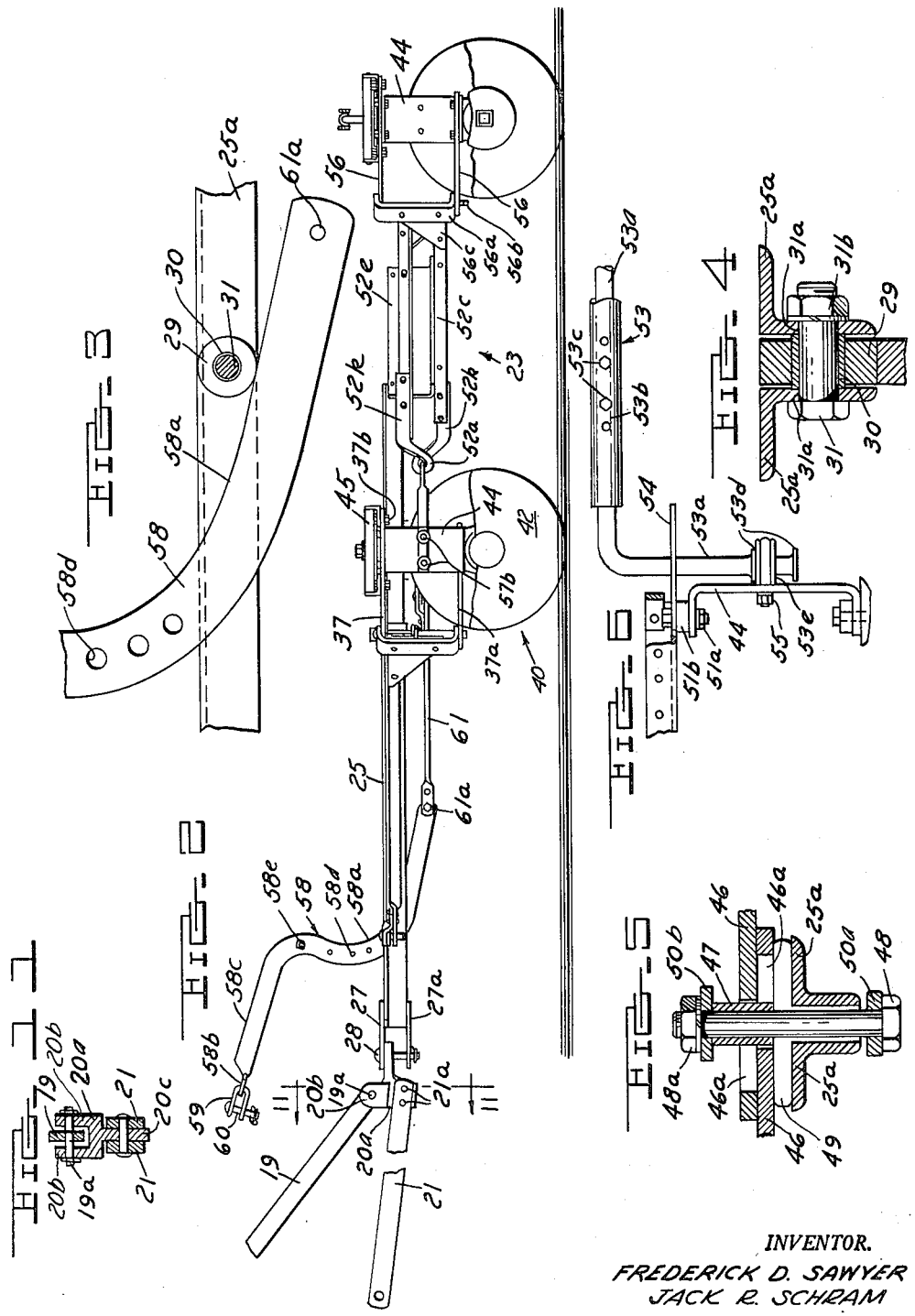

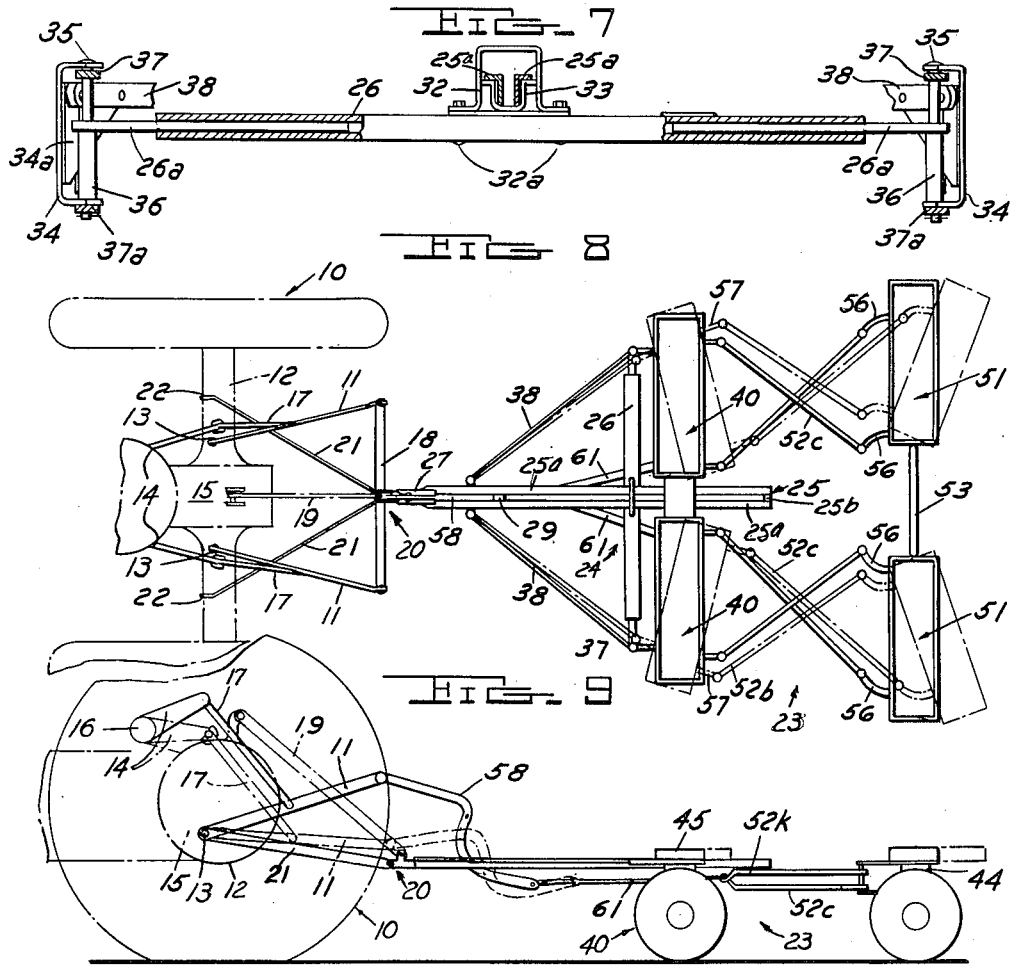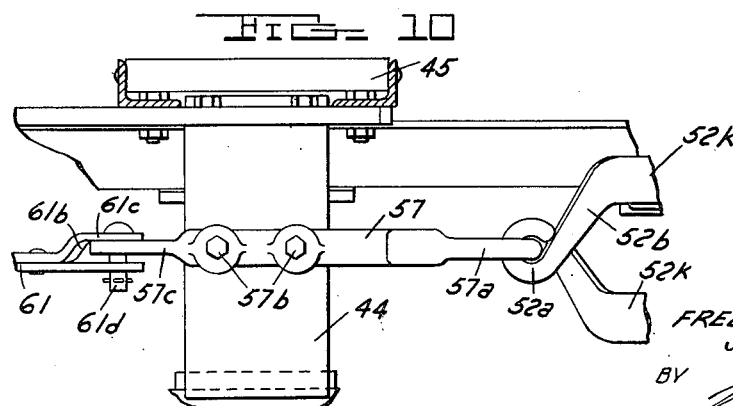

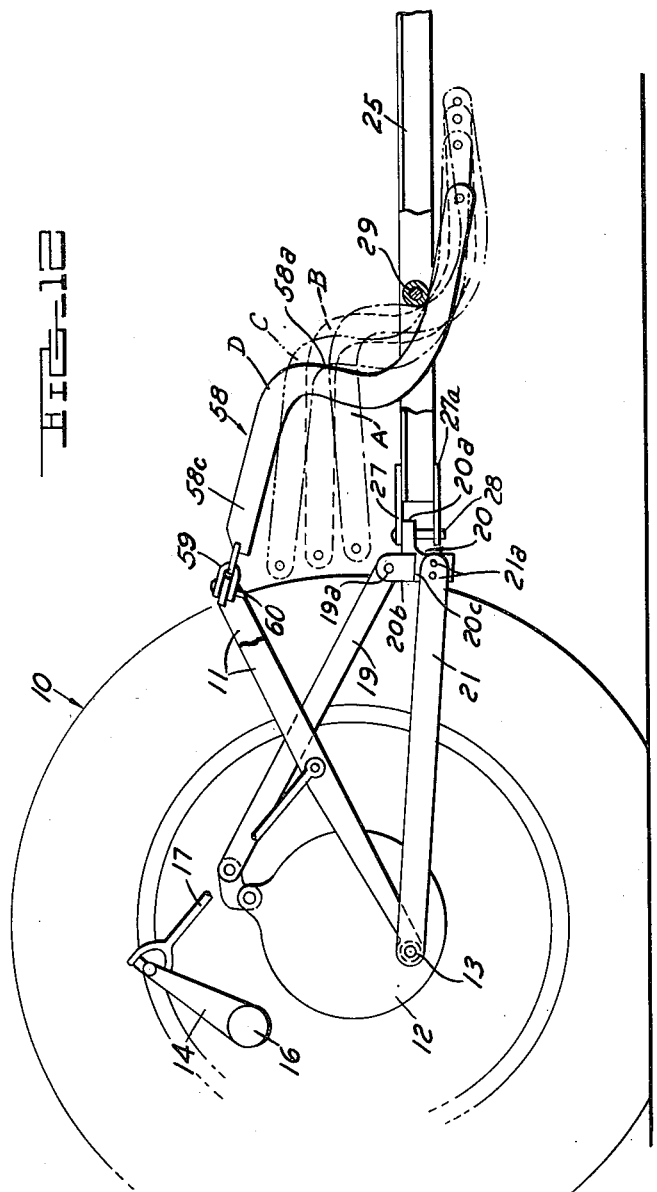

2,763,112
DISC HARROW

Frederick D. Sawyer, Wayne, and Jack R. Schram, Berkley, Mich., assignors, by mesne assignments, to Ford Motor Company, Dearborn, Mich., a corporation of Delaware Application October 28, 1950, Serial No. 192,796

12 Claims. (Cl. 55—83)

This invention relates to an improved disc harrow and more particularly to a disc harrow for use with a well known type of tractor having power lifted hitch links which are utilized to control the angle of the disc gangs.

The disc harrow has long been recognized as an efficient tool for breaking up plowed ground in preparation of the seed bed. The disc gangs of such a harrow are generally angularly adjustable to permit the disc gangs to be set to the optimum working position to suit the particular soil condition, as well as to permit the gangs to be positioned with the discs aligned in the direction of travel of the tractor to facilitate towing of the disc harrow to the working area with a minimum of damage to the areas traversed.

Heretofore, there have been a variety of disc harrows designed for use with a well known type of tractor having power lifted hitch links in which the hitch links are utilized for power angling of the gangs. However, these prior harrows incorporated costly and complicated mechanisms to effect such gang angling control. In addition to the gang angling feature, it is important that the gangs of the harrow be supported in such manner as to insure uniform penetration at each end of the gangs while permitting limited vertical movement of the ends thereof to clear obstructions or follow the ground contour and prior harrow constructions have not successfully and economically met this requirement.

Accordingly, it is an object of this invention to provide an improved disc harrow of simple, rugged, economically manufacturable construction.

A particular object is to provide an improved gang angling mechanism for a disc harrow for use with a tractor of well known make having power lifted draft links.

A further object of this invention is to provide a cam actuated, variable leverage disc gang angling device for a disc type harrow which is operable by the power lifted draft links of a well known type of tractor.

Still another object of this invention is to provide an improved mounting for the gangs of a disc harrow which will provide uniform penetration by the gangs and permit limited vertical movement of the ends thereof to clear obstructions or follow ground irregularities.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Fig. 1 is a plan view of a tandem type disc harrow embodying this invention, showing the gangs in their non-angled position.

Fig. 2 is a side elevational view of Fig. 1.

Fig. 3 is an enlarged detail sectional view taken along the plane 3—3 of Fig. 1.

Fig. 4 is an enlarged sectional view taken along the plane 4—4 of Fig. 1.

Fig. 5 is an enlarged sectional view taken along the plane 5—5 of Fig. 1.

Fig. 6 is an enlarged fragmentary end view of Fig. 1 substantially encompassed by the line 6—6 of Fig. 1.

Fig. 7 is an enlarged sectional view taken along the plane 7—7 of Fig. 1.

Fig. 8 is a reduced scale schematic plan view of an alternative form of the improved disc harrow shown attached to a tractor of well known type illustrating several positions of angularity of the disc gangs.

Fig. 9 is a side elevational view of Fig. 8 showing two positions of the disc gang cam angling device.

Fig. 10 is an enlarged detail view taken along the plane 10—10 of Fig. 1.

Fig. 11 is an enlarged sectional view taken along the plane 11—11 of Fig. 2.

Fig. 12 is an enlarged detail side view showing the gang angling device of the alternative form of the invention in a plurality of different positions.

As shown on the drawings:

The disc harrow of one form of this invention utilizes the power lifted trailing draft links of a well known type of tractor 10 for actuation of a disc gang angling mechanism. Figs. 8, 9 and 12 show the rear end of tractor 10 having a pair of trailing draft links 11 pivoted to the rear axle housing 12 of such tractor at laterally spaced points 13 thereon. Draft links 11 are vertically lifted by a pair of transversely spaced lift arms 14 journaled near the top of the differential housing 15 by a transverse shaft 16. Lift arms 14 are rockable by a built-in hydraulically operated mechanism (not shown). Connection between lift arms 14 and draft links 11 is effected by a pair of connecting links 17 respectively pivotally connected at their ends to lift arms 14 and draft links 11.

The extreme rear ends of draft links 11 support a transverse drawbar 18 and drawbar 18 is provided with a plurality of laterally spaced, vertically disposed mounting holes 18a for a purpose to be later described. Tractor 10 also has a top link 19 which is pivotally connected to the top central portion of the tractor rear axle housing 12. The above described construction of the tractor is all conventional and hence further description thereof is not believed necessary.

Top link 19 supports a draft member 20 comprising a body portion 20a having a rearwardly projecting plate-like end, and on top of such body portion there are provided a pair of laterally spaced, upstanding lugs 20b. The rear end of link 19 is placed between such lugs and is pivotally secured thereto by a transverse pin 19a supported within suitable transverse holes. A downwardly depending lug 20c is provided underneath lugs 20b and a pair of forwardly projecting bar members 21 are respectively secured to the lug 20c by bolts or rivets 21a and to laterally spaced points 22 on rear axle housing 12 as best shown in Fig. 8, use being made of the so-called stabilizer brackets (not shown) generally provided on tractor 10. The bars 21 when so secured, define a V, or wishbone shaped, rearwardly projecting draft member.

The improved disc harrow 23 of this invention comprises a cruciform frame 24 having a longitudinal draft member 25 and a transverse stabilizing bar 26 mounted on such draft member. Draft member 25 consists of a pair of transversely spaced angle iron members 25a separated at their rear ends by an angle iron tie member 25b welded or otherwise secured between the angle bars 25a. The front ends of bar members 25a are maintained in transversely spaced relationship by top and bottom tongue bars 27 and 27a preferably welded to such forward ends of bars 25a. Vertically aligned holes (not shown) are respectively provided in the ends of tongues 27 and 27a to receive a vertically disposed bolt 28 which permits pivotal mounting of the tongue members 27 and 27a to body portion 20a of draft bracket 20, as best shown in Figs. 2 and 12.
}

Rearwardly of tongue members 27 and 27a and between the vertical flanges of angle bars 25a, there is rotatably mounted a roller 29 for a purpose to be later described. Roller 29, as best shown in Fig. 4 is rotatably mounted on a sleeve 30 which in turn surrounds a transverse bolt 31 supported by aligned transverse holes 31a respectively provided in bars 25a. A nut 31b screwed on to bolt 31 secures such bolt to bar member 25a.

Stabilizer bar 26 is preferably constructed of a rectangular tubular configuration and has projecting telescoping end extensions 26a which slidably cooperate with the interior walls of bar 26. Centrally disposed on bar 26 is an inverted U-shaped strap member 32 which is secured to such bar 26 by a pair of bolts 32a, as best shown in Fig. 7. A U-shaped cradle member 33 is secured by welding inside of the inverted U-shaped strap member 32 and receives the vertical flange portions of angle bars 25a. The horizontal flange portions of angle bars 25a normally rest on top of the outwardly flared sides of cradle member 33, as best shown in Fig. 7. The inverted U-shaped strap member 32 which surrounds angle bars 25a limits the vertical movement of stabilizer bar 26 relative to longitudinal bars 25a as will be later explained.

The ends of bar extensions 26a respectively support vertical brackets 34. Brackets 34 are essentially of U-shaped configuration and are respectively mounted on vertical pins 35 inserted in suitable vertical holes provided in the ends of bar extensions 26a. A spacer sleeve 36 is provided on each pin 35 and such sleeves preferably are disposed between the underside of extensions 26a and the bottom of U-shaped bracket 34, as best shown in Fig. 7. A pair of disc gang connecting bars 37 and 37a are mounted on each pin 36 in vertically spaced relationship as will be later described. A triangular shaped gusset plate 34a is secured by riveting or welding to each bracket 34 and the rear ends of a pair of brace members 38 are respectively secured to gussets 34a by riveting. The forward ends of braces 38 are connected to transversely aligned lugs 39 welded respectively to angle bars 25a, as best shown in Fig. 1. A vertically disposed bolt 39a effects the connection of the forward ends of bars 38 to lugs 39.

A pair of disc gangs 40 are pivotally mounted on draft member 25, as best shown in Figs. 1 and 2. Disc gangs 40 are of conventional construction comprising longitudinally disposed shafts 41 having a plurality of discs 42 secured in axially spaced relationship on shafts 41 in a well known manner, shafts 41 being journaled in suitable bearings 43 which are horizontally secured to the bottom of channel shaped hangers 44 by bolts 44a. Hangers 44 project vertically upwardly above shaft 41 and discs 42 and the usual weight box 45 of welded angle iron construction is secured to the top of such hangers by suitable bolts. The inner end of each disc gang 40 is provided with an inwardly projecting plate-like member 46 which is rigidly secured on top of the adjacent hanger 44 as by bolts. Plates 46 overlap one another and overlie the groove defined by the spaced apart angle bars 25a. Aligned longitudinal, elongated slots 46a are respectively provided in each plate 46 through which is inserted a vertically disposed sleeve 47 (Fig. 5). Sleeve 47 is inserted in the longitudinal groove defined by the transversely spaced bars 25a to receive a vertically disposed bolt 48 projecting upwardly between the spaced apart bars 25a to slidably secure the plates 46 to bars 25a. A spacer member 49 preferably surrounds bolt 48 and rests on top of angle bars 25a. A washer 50a is placed between the head of bolt 48 and the bottom edge of angle bars 25a and a washer 50b is placed between a nut 48a and the top of sleeve 47. Tightening nut 48a secures such assembly to bars 25a. This arrangement thus permits limited upward vertical movement of plates 46 from the position shown in Fig. 5, and hence limited upward vertical movement of the inner ends of disc gangs 40.

The outer ends of disc gangs 40 are respectively connected to bar extensions 26a by the longitudinal rearwardly extending connecting bars 37 and 37a previously mentioned. Bars 37 are connected to the underside of box 45 by a pair of bolts 37b, as best shown in Fig. 2. The lower bars 37a are secured to the lower portion of hangers 44 by suitable bolts (not shown). Bars 37 and 37a being thus held in spaced parallel relationship permit limited downward vertical movement of the outer ends of disc gangs 40 on pins 35 from the position shown in Fig. 7.

A second pair of disc gangs 51 are mounted rearwardly of the front gangs 40 and such gangs are connected to the front pair of gangs by two pairs of crossed connecting bar members 52 as will be described. Rear gangs 51 are substantially identical to gangs 40 except that the discs on the supporting shafts are reversed, in position.

The inner end of rear gangs 51, however, are connected together by an inverted U-shaped tie member 53 which comprises a pair of inverted L-shaped leg members 53a telescopically joined by a sleeve 53b forming the bight portion of tie member 53. Bolts 53c passing through selected holes in sleeve 53b secure leg members 53a of tie member 53 in a selected position of longitudinal adjustment. A pair of axially spaced, integral radial flanges 53d are formed on the ends of leg members 53a as shown in Fig. 6. A split ring member 53e slidably surrounds the portion of leg 53a between flanges 53d and each of such rings is secured to the adjacent hanger 44 by a U-bolt 55. This construction permits limited vertical movement of tie member 53. A horizontally disposed U-shaped guide member 54 surrounds the upper end of each leg member 53a. Bolts 51a respectively secure guides 54 to rear hangers 44 as shown in Fig. 6, a washer 51b preferably separating such guide from hanger 44.

A rearwardly projecting horizontal bracket 57 (Fig. 10) provided with an eye 57a integrally formed on its trailing end, as best shown in Fig. 1, is secured to each of the forward gang hangers 44 by a pair of bolts 57b. The adjacent brackets 57 provided on the inner ends of front gangs 40 each have a forwardly projecting end portion 57c to which there are connected tie rods 61 as will be later described. Stabilizing connections between front and rear gangs in the form of crossed angle bars 52 are provided, each bar having forged forward end loops 52k secured thereto by bolts 52d.

Each of the forward end portions 52k of cross bars 52 has an offset portion 52b which permits each pair of cross bars 52 to overlie one another. An angle member 52e, best shown in Figs. 1 and 2, is secured to the vertical flange of each of the upper cross bars 52 and the horizontal flange of such member 52c rests on top of the horizontal flange 52c of the lower cross bar 52. The rear ends of cross bars 52 are respectively secured to arcuately shaped, forwardly projecting brackets 56 respectively secured to the rear gang hangers 44 as best shown in Fig. 2. Brackets 56 comprise essentially arcuately shaped bar members as best shown in Fig. 1 and are disposed on each rear gang so as to curve inwardly. Brackets 56 are secured to hangers 44 by the same bolts utilized for securing the shaft bearing and the weight box to such hangers. Brackets 56 respectively pivotally support a U-shaped connecting member 56a pivotally mounted to brackets 56 by a vertical pin 56b (Fig. 2). Gusset plates 56c are riveted or otherwise rigidly secured between member 56a and the trailing ends of bars 52c.

As was previously mentioned, disc gangs 40 may be angularly adjusted relative to the draft member 25 to set the gangs to the optimum working angle for discing the plowed soil. Such adjustment is effected by a cam bar angling device 58 as best shown in Fig. 2. The cam angling device 58 comprises a somewhat S-shaped bar having a non-uniformly curved cam surface 58a provided centrally on its rearwardly disposed edge. The forward end 58c of cam bar 58 terminates in an eye portion 58b through which a clevis 59 is inserted and such clevis partially surrounds tractor drawbar 18 and a clevis pin 60 is insertable through such clevis and a selected hole 18a in drawbar 18 to pivotally mount the forward end of cam angling bar 58 to drawbar 18. Cam bar 58 fits within the longitudinal groove defined by the transversely spaced angle bars 25a and the cam surface 58a of such bar contacts the periphery of roller 29. A pair of connecting rods 61 are pivotally connected by a bolt 61a to opposite sides of the trailing end of cam bar 58. Rods 61 diverge, as shown in Fig. 1, and the trailing ends of such rods have a fork portion 61b (Fig. 10) formed by riveting on offset strap member 61c to the end thereof. The end 57c of each inner bracket 57 projects forwardly into the corresponding fork 61b and such forks are secured thereto by a vertical pin 61d.

*Operation*

When the disc harrow is mounted on the tractor 10 with the disc gangs in aligned parallel relationship, as best shown in Fig. 1, only a minimum of cutting action from the discs is obtained. Such position is utilized primarily for transporting the disc to the working area. The gangs are maintained in such parallel relationship as long as the hitch links 11 are held in a raised position by lift arms 14 as best shown in Figs. 2, 9 and 11. In this position of the hitch links 11 cam bar 58 is moved to its extreme forward position, which maintains connecting rods 61 forwardly thereby holding the inner ends of disc gangs 40 and hence rear gangs 51 in the position shown in Fig. 1.

With the tractor in motion, the disc gangs may be angled to the position shown in dotted outline in Fig. 8 by lowering hitch links 11. The ground forces or drag on the disc gangs 40 and 41 will then effect the angling of such gangs to the position shown in dotted lines in Fig. 8, and hence effect lowering of hitch links 11 by the rearward pull of connecting rods 61 acting on cam bar 58. Bolt 48 will then slide along the longitudinal groove defined by the transversely spaced angle bars 25a to permit angling of the gangs 40. Extension bars 26a telescope somewhat within stabilizer bar 26 to permit such angling. The connection of rear disc gangs 51 to the forward disc gangs 40 by the cross bars 52 and 52a produces a concurrent angling of rear disc gangs 51, but in a reverse direction to that of the front disc gangs.

The unique action effected by the described arrangement of stabilizer bar 26 will now be pointed out. It is a well known fact that when the gangs of a disc harrow are in their angled working position, there is an inherent tendency for each disc gang to tilt in a vertical plane so that one end of the gang tends to penetrate the soil to a greater extent than the other end. The end of the gang tending to rise out of the soil is that end corresponding to the convex faces of the discs. Thus, in the described disc harrow, there is an inherent tendency for the inner ends of the front gangs 40 to rise out of the soil and penetrate less than the outer ends of the front gangs 40. Since the discs are reversed in position on the rear gangs 51, it follows that there is an inherent tendency for the outer ends of the rear gangs 51 to rise out of the soil or penetrate less than the inner ends. Heretofore, schemes to eliminate such uneven penetration have followed two approaches. One such approach has been to permit the harrow frame to positively hold down the inner gang ends to prevent such upward movement tendencies of the inner ends of the front gangs. The second approach was to utilize cross bar connectors between the front and rear gangs, similar to the connecting bars 52 herein described, and it was thus hoped that the tendency of the outer end of the rear gang to rise would balance the tendency of the inner end of the front gang to rise. Needless to say, however, this approach required a very exact balancing of the relative tilting forces to which the front and rear gangs are respectively subjected.

Referring particularly to Fig. 7, it will be noted that the stabilizing bar 26 operates directly in reverse to the action of the stabilizing bars heretofore employed, namely the stabilizer bar 26 functions to positively hold down the outer ends of the front gangs 40, while still permitting a limited degree of vertical tilting movement of each front gang 40 with respect to the main frame. It should be further noted by reference to Fig. 8 that the intersection point of the connecting bars 52 is located substantially nearer to the front gangs 40 than to the rear gangs 51. Accordingly, the tilting tendencies of the rear gangs 51 are provided with a greater lever advantage to operate in opposition to the tilting tendencies of the front gangs 40 and, in fact, the arrangement is so designed that the rear gangs 51 produce an overbalancing of the tilting tendencies of the front gangs 40. As a result, the outer ends of the front gangs 40 actually tend to rise out of the soil, or to penetrate to a lesser degree than the inner ends of the front gangs 40, but are prevented from accomplishing such tendency by the positive restraint provided by the stabilizer bar 26. The results of such an unconventional approach to stabilization of disc gangs of a disc harrow has been adequately proven by extensive tests to be unusually effective and to provide a degree of uniformity of penetration of all of the gangs of the harrow far in excess of that achieved by any harrow constructions heretofore known or utilized.

The operation of the cam angling bar 58 in shifting the disc gangs from their angled working position to their aligned transport position will now be considered in more detail. As previously indicated, the disc gangs of the harrow are forcibly returned from their angled position to their aligned position by the movement imparted to the cam bar 58 by the power lifted hitch links of the tractor. Referring particularly to Fig. 12, a unique force ratio variation action of the cam bar 58 may be conveniently observed. In Fig. 12, four successive positions of the cam bar 58 have been illustrated and for reference convenience have been indicated as positions A, B, C and D. Position A corresponds to the position assumed by cam bar 58 when the disc gangs are in their maximum angled position. Position D corresponds to the position of cam bar 58 when the disc gangs are in their aligned position. Positions B and C are equally intermediate these two extreme positions. It should be noted that when the hitch links 11 are raised by equal angular increments from position A to B and from position B to C, the trailing end of cam bar 58 moves forwardly by unequal increments. This is due to the fact that in position A, a substantially vertical portion of the cam surface 58a is in contact with the roller 29, and hence upward movement of the cam bar 58 by the hitch links 11 produces only a slight forward movement of the trailing end of the cam bar 58. Since the curved cam surface 58a gradually becomes more horizontal, further raising movement of the hitch links 11 produces correspondingly greater forward displacements of the trailing end of the cam bar 58. Hence, it is clearly apparent that the cam bar 58 permits the hitch links 11 to exert a maximum effort on the disc gangs to initially return them from their full angled position and, of course, this is when the greatest forces in opposition to such return movement of the disc gangs are encountered. As the disc gangs approach their angled position, the effective force transmission ratio between the hitch links 11 and the cam bar 58 is decreased, so that the trailing end of the cam bar 58 is shifted forwardly by greater increments for each successive equal increment of travel of the hitch links. Hence, the return of the disc gangs to their aligned position is accomplished without requiring any excessive travel of the hitch links 11.

While many tractors of the type herein referred to incorporate suitable controls in the hydraulic mechanism which operates so as to maintain such hitch links at any selected angular position, there are some tractors having power lifted hitch links which do not have this feature of controlled angular position of the hitch links 11. Obviously, the ability to hold the hitch links 11 at any selected angular position permits the described type of disc harrow to be operated at any selected degree of angularity of its disc gangs. However, the described harrow of one form of the invention may also be effectively operated at any desired degree of gang angularity with tractors not having the angularly controlled hitch links by the simple expedient of providing a plurality of apertures 58d spaced along the central portions of the cam bar 58, and then selectively inserting a stop pin or bolt 58e in one of such holes. Stop pin 58e projects laterally beyond cam bar 58 sufficiently to engage the top flanges of the central frame angles 25a. Hence if the stop pin 58e is inserted in the foremost aperture 58d, the disc gangs will assume the maximum angular position and will be held against greater displacement by the stop pin 58e. Inserting the stop pin 58e in successive ones of the other apertures 58d will successively incrementally limit the degree of angular position assumed by the disc gangs of the harrow.

From the above description it is clearly apparent that there is here provided an improved tandem disc harrow for use with a well known type of tractor having a so-called three point linkage, such linkage being utilized to actuate a cam bar for angling the disc gangs. The variable leverage provided by the cam bar makes more effective use of the available power in the tractor hitch links. The tilt compensation mechanism assures uniform penetration of all gangs yet permits ground contours to be followed. It is further pointed out that the simplicity and ruggedness of this improved harrow points towards longer life while at the same time effecting economies in the manufacture of the harrow.

It will, of course, be understood that various details of construction may be varied through a wide range without departing from the principles of this invention and it is, therefore, not the purpose to limit the patent granted hereon otherwise than necessitated by the scope of the appended claims.

We claim:

1. For use with a tractor having a power lifted arm, a disc harrow comprising frame structure including a longitudinally disposed draft tongue having means on its forward end for attachment to the tractor, a disc gang shiftably mounted on said frame structure for relative horizontal movement to vary the angular position of the disc gang with respect to the direction of travel, a disc gang angle operator comprising an elongated bar, means for connecting one end of said bar to said disc gang, means for connecting the other end of said bar to the tractor lift arm, a cam surface formed on the medial portion of said bar, and a cam follower secured to said tongue and disposed in overlying abutting relationship to said cam surface, whereby raising of said tractor lift arm produces an angular shifting of said disc gang, said cam surface being shaped to provide a decreasing effective force transmission ratio as said lift arm is raised.

2. For use with a tractor having a power lifted arm, a disc harrow comprising frame structure including a longitudinally disposed draft tongue having means on its forward end for attachment to the tractor, the medial portions of said draft tongue defining a longitudinal slot, a disc gang shiftably mounted on said frame structure for relative horizontal movement to vary the angular position of the disc gang with respect to the direction of travel, a disc gang angle operator comprising an elongated bar, means for connecting one end of said bar to said disc gang, means for connecting the other end of said bar to the tractor lift arm, the medial portion of said bar passing through said slot in the draft tongue, a roller mounted transversely in said slot and abutting the upper surface of said bar, whereby lifting of said tractor arm produces an angular shifting of said disc gang.

3. The combination defined in claim 2 wherein said medial portion of said bar has a plurality of apertures spaced therealong, and a stop selectively insertable in said apertures and engageable with said draft tongue to limit the degree of angularity assumed by said gangs.

4. For use with a tractor having a power lifted arm, a disc harrow comprising frame structure including a longitudinally disposed draft tongue having means on its forward end for attachment to the tractor, the medial portions of said draft tongue defining a longitudinal slot, a disc gang shiftably mounted on said frame structure for relative horizontal movement to vary the angular position of the disc gang with respect to the direction of travel, a disc gang angle operator comprising an elongated bar, means for connecting one end of said bar to said disc gang, means for connecting the other end of said bar to the tractor lift arm, the medial portion of said bar passing through said slot in the draft tongue, a roller mounted transversely in said slot and abutting the upper surface of said bar, whereby lifting of said tractor arm produces an angular shifting of said disc gang, said upper surface of said bar having a vertical reversely curved medial portion shaped to cooperate with said roller to provide a decreasing effective force transmission ratio as said lift arm is raised.

5. The combination defined in claim 4 wherein said medial portion of said bar has a plurality of apertures spaced therealong, and a stop selectively insertable in said apertures and engageable with said draft tongue to limit the degree of angularity assumed by said gangs.

6. The combination defined in claim 4 wherein said bar has a vertical reversely curved medial portion, thereby vertically offsetting the opposite ends of the bar to lie respectively above and below said draft tongue.

7. For use with a tractor having a power lifted arm, a disc harrow comprising a longitudinally disposed draft tongue having means on its forward end for attachment to the tractor, said tongue defining a longitudinally extending slot, a pair of disc gangs, a disc gang mounting member slidably mounted in said draft tongue slot, means for pivotally securing the inner ends of said disc gangs to said mounting member, a pair of links respectively pivotally interconnected between the outer ends of said disc gangs and the forward portion of said draft tongue, whereby the angular position of said disc gangs may be varied by shifting the longitudinal position of said mounting member relative to said draft tongue, a longitudinally disposed disc gang operating bar having its medial portion passing through said slot, means for connecting the forward end of said bar to the tractor lift arm, link means for respectively connecting the rearward end of said bar to the inner ends of said disc gangs, and a roller transversely disposed in said tongue slot and having rolling engagement with the upper surface of said bar, whereby raising of said tractor lift arm produces angular shifting of said disc gangs.

8. For use with a tractor having a power lifted arm, a disc harrow comprising a longitudinally disposed draft tongue having means on its forward end for attachment to the tractor, said tongue defining a longitudinally extending slot, a pair of disc gangs, a disc gang mounting member slidably mounted in said draft tongue slot, means for pivotally securing the inner ends of said disc gangs to said mounting member, a pair of links respectively pivotally interconnected between the outer ends of said disc gangs and the forward portion of said draft tongue, whereby the angular position of said disc gangs may be varied by shifting the longitudinal position of said mounting member relative to said draft tongue, a longitudinally disposed disc gang operating bar having its medial portion passing through said slot, means for connecting the forward end of said bar to the tractor lift arm, link means for respectively connecting the rearward end of said bar to the inner ends of said disc gangs, and a roller transversely disposed in said tongue slot and having rolling engagement with the upper surface of said bar, whereby raising of said tractor lift arm produces angular shifting of said disc gangs, said upper surface of said bar having a vertical reversely curved medial portion shaped to cooperate with said roller to provide a decreasing effective force transmission ratio as said lift arm is raised.

9. The combination defined in claim 8 wherein said medial portion of said bar has a plurality of apertures spaced therealong, and a stop selectively insertable in said apertures and engageable with said draft tongue to limit the degree of angularity assumed by said gangs.

10. The combination defined in claim 8 wherein said bar has a vertical reversely curved medial portion, thereby vertically offsetting the opposite ends of the bar to lie respectively above and below said draft tongue.

11. For use with a tractor having a power lifted arm, an implement comprising a frame including a draft tongue, an earth working tool pivoted to said tongue, a cam bar pivotally connected at one end to the power-lifted arm, said cam bar having a substantially S-shaped cam surface formed on its medial portion, fulcrum means on said draft tongue engageable with said cam surface, and means connecting the other end of said cam bar to said earth working tool, said cam surface cooperating with said fulcrum means upon raising of the power-lifted arm to concurrently pivot and longitudinally shift said cam bar relative to said follower means for shifting said earth working tool relative to said tongue.

12. For use with a tractor having a power lifted arm, an implement comprising a frame including a draft tongue, a disc gang, means slidably securing the inner end of said disc gang to said draft tongue, an elongated bar having an S-shaped cam surface, follower means on said draft tongue engageable by said cam surface, and means respectively connecting said cam bar to said power lifted arm and said disc gang, whereby raising of said lift arm concurrently pivots and slides said S-shaped cam surface relative to said follower means for longitudinally moving the inner end of said disc gang along said draft tongue.

References Cited in the file of this patent
UNITED STATES PATENTS

| | | |
|---|---|---|
| 369,300 | Stoddard | Aug. 30, 1887 |
| 1,798,899 | Paul | Mar. 31, 1931 |
| 1,967,493 | Boda | July 24, 1934 |
| 2,171,768 | Sjorgrun et al. | Sept. 5, 1939 |
| 2,343,482 | Simonka | Mar. 7, 1944 |
| 2,351,168 | Warne | June 13, 1944 |